United States Patent Office 2,978,430
Patented Apr. 4, 1961

2,978,430

POLYPROPYLENE COMPOSITIONS

William E. Thompson, Wallingford, and Daniel R. Mullin, Chester, Pa., assignors to Sun Oil Company, Philadelphia, Pa., a corporation of New Jersey No Drawing. Filed July 5, 1957, Ser. No. 669,930

6 Claims. (Cl. 260—31.8)

This invention relates to new compositions of matter and methods for their preparation. More particularly, the present invention relates to solid polymers of propylene compounded with certain additives to give new compositions of enhanced properties.

Low molecular weight olefins such as propylene have heretofore been polymerized to relatively low molecular weight liquids or soft amorphous solids through the use of polymerization catalysts such as aluminum trichloride, boron trifluoride, and the like. Such olefins can be polymerized to relatively high molecular weight solid polymers by contacting the olefin with a dispersion of titanium trichloride and an activator such as aluminum triethyl maintained in an inert, liquid reaction medium. Generally such processes produce polymers of propylene having molecular weights of above about 25,000 and usually within the range of from about 50,000 to 250,000. A proportion of the solid products obtained with propylene using the mentioned catalyst appears crystalline, i.e., exhibits a crystalline structure by X-ray analysis. The crystalline polymer is relatively insoluble in the usual hydrocarbon solvents, such as the paraffins including for example, the pentanes, hexanes, octanes, decanes, and the like, even at elevated temperatures. However, the crystalline polymer can be dissolved in such solvents at relatively high temperatures, as hereinafter described. This insolubility provides a means of separating crystalline polymers from amorphous polymers of propylene which are also formed in the process, since the amorphous polymers are quite soluble in such hydrocarbons. Although the crystalline polymers of propylene, hereinafter for convenience designated "polypropylene," possess many desirable properties, they are not suitable for use in many applications because of their high brittle points. By "brittle point" is meant the temperature at which the polymer exhibits brittle failure under specific impact conditions as measured by ASTM test (D–746–55T). For example, thin films or fibers of polypropylene are not suitable for use in applications where flexibility is required, such as for use as wrapping materials, because of cracking at temperatures encountered under usual room temperatures, or slightly below usual room temperatures. Likewise, polypropylene is not suitable for preparing fluid containers, fluid conduits, or like articles for the same reason.

Many plasticizers heretofore used with various plastic materials do not appear suitable for improving the brittle point of polypropylene because such materials lower the tensile strength and/or adversely affect other physical properties of the polymer, such as the melting point, melt index, and the like.

An object of the present invention is to provide a polypropylene composition having a low brittle point. Another object is to provide a new composition of matter having a low brittle point comprising a relatively high molecular weight polypropylene admixed with a minor quantity of a monomer additive. A further object is to provide a process for preparing polypropylene compositions having low brittle points. Other objects and their achievement in accordance with the invention appear hereinafter.

It has now been found that solid polymers of propylene having improved properties can be prepared by compounding polypropylene with a minor quantity of certain monomers which are bicyclic compounds or esters of certain polyfunctional organic acids, as hereinafter described.

The crystalline polypropylene used in the process of the invention is prepared by polymerizing propylene with a solid catalyst maintained as a dispersion in an inert, liquid diluent, such as n-heptane or isooctane. The solid catalyst is preferably a halide of a metal such as zirconium, chromium, vanadium, molybdenum or titanium wherein the metal is in a valence state other than its highest valence state. A lower halide of titanium such as titanium trichloride or titanium dichloride, or a mixture thereof, is preferred. The metal halide is used with an activator therefor such as an aluminum alkyl. For example, aluminum triethyl, aluminum triisopropyl, aluminum tri-n-propyl, or aluminum triisobutyl are suitable activators and give good results. Generally a mole ratio of activator to metal halide of 1:1 to 12:1 is used. Temperatures of from about 0° C. to 170° C. are suitable. Atmospheric pressure can be used although elevated pressures are preferred in that the polymerization reaction proceeds at a faster rate at such elevated pressures, say up to about 10,000 p.s.i.g. (pounds per square inch gauge). Polypropylene is recovered from the reaction system by draining the inert, liquid reaction medium and the catalyst is deactivated and removed by contacting the polypropylene with water, alcohol or an aqueous or alcoholic solution of an inorganic acid, such as nitric acid, with vigorous agitation. Preferably such agitation provides for comminuting the polymer during the contacting with the catalyst deactivating liquid to insure good catalyst deactivation. The polymer is then repeatedly washed to remove at least a major proportion of the residual inorganic material from the catalyst, and is then dried. The described procedure yields a product which is a mixture of a predominate amount of crystalline polypropylene with a minor amount of amorphous polypropylene. The amorphous polymer can be removed by dissolution in a hydrocarbon solvent at an elevated temperature below the temperature at which the crystalline polymer is dissolved. For example, dissolution of the amorphous polymer in n-pentane at the boiling point of n-pentane (under atmospheric pressure), or n-heptane, isooctane, tetrahydronaphthalene, decahydronaphthalene, or the like gives good results. The resulting crystalline polypropylene is then used in the process of the invention. However, a quantity of the amorphous polymer, by which is meant the polymer which is soluble in n-pentane at the boiling point of n-pentane under atmospheric pressure, say up to about 10% by weight, can be present with the crystalline polymer and good results obtained. The crystalline polypropylene will generally have a molecular weight of from about 25,000 to 300,000 and usually from about 50,000 to 250,000, a melting point of from about 161° C. to 171° C., and exhibits a crystalline structure by X-ray analysis. The polypropylene may be combined with a small quantity of oxygen, such as from oxidation by contacting air, and good results obtained, even though such oxidation increases the brittle point of the polymer. Generally the quantity of oxygen is below about 0.1%. In order to prevent excessive oxidation, it is advantageous to incorporate an oxidation inhibitor in the polymer shortly after or during the preparation. The presence of the inhibitor, in the quantities required to substantially completely prevent oxidation, does not adversely affect the compositions of the present invention.

The additives of the present invention are monomeric compounds selected from the group consisting of bicyclic compounds wherein the rings are fused and organic acids having at least three functional groups which have been converted to ester linkages.

The bicyclic additives of the invention can have a naphthalene nucleus, in which case there must be at least one substituent, preferably an alkyl substituent, in the beta position. However, the alkyl group can contain functional groups and good results obtained. Beta-methyl naphthalene, diamyl naphthalene having at least one of the amyl radicals in the beta position, methyl-beta naphthyl ketone, beta-ethyl naphthalene and homologues thereof illustrate the bicyclic additives having a naphthalene nucleus which can be employed. The rings of the bicyclic additive can also be saturated, in which case it is not essential that the nucleus have alkyl substituents. For example, decahydronaphthalene gives good results. However, the decahydronaphthalene can have alkyl substituents, such as beta-ethyl decahydronaphthalene, and good results are obtained with such compounds. Tetrahydronaphthalene and alkyl substituted derivatives thereof likewise give good results. The organic acids having at least three functional groups which have been converted to ester linkages which can be used include the esters of tricarballylic acid and citric acid. Acetyl tributyl citrate is the preferred compound within this class, but the tripropyl and triester thereof, and the corresponding esters of tricarballylic acid, can be used with good results.

In order to prepare the compositions of the present invention, it is essential that the additive come within one of the above-defined groups. Similar compounds not within the above definitions do not give equivalent results. For example, alpha-methyl naphthalene is not suitable for use as above described, and other materials heretofore described as additives for polymers likewise are not suitable.

From about 7% to 25% by weight of the subject additive can be incorporated in polypropylene. When less than the stated amount is used, the brittle point is not significantly affected, whereas large quantities adversely affect other properties such as the melt index. The compositions are prepared by heating the polypropylene to a temperature above its melting point, dissolving the additive therein, mixing and cooling the resulting composition. If an oxidation inhibitor has not been incorporated into the polypropylene, the composition is advantageously prepared under an inert atmosphere, such as an atmosphere of nitrogen, to prevent oxidation of the polypropylene.

The following examples illustrate compositions of the invention and their preparation. In the examples, "parts" refers to parts by weight. The polypropylene had a molecular weight of about 150,000, a melt index of about 0.1 and a melting point of about 170° C. Prior to incorporating the additives, about 0.1% by weight of an oxidation inhibitor, 2,2'-methylene-bis-(4-methyl-6-tertiary butyl phenol) was incorporated into the polypropylene. The "brittle point" as stated in the examples was determined by ASTM method D–746–55T. Compositions having a brittle point of above −4° C. are considered to fail in the test. By "melt index," as used herein, is meant the weight of polymer, expressed in grams, extruded in ten minutes through an orifice 0.0823 inch in diameter from a barrel 0.3760 inch in diameter under the force of a piston weighing 2160 grams, the polymer being maintained at 190° C. during the extrusion.

*Example 1*

10% by weight of naphthalene, alpha-methyl naphthalene and beta-methyl naphthalene were incorporated into separate portions of polypropylene. Of the resulting compositions, those containing naphthalene and alpha-methyl naphthalene both failed in the brittle test, i.e., the brittle point of the composition was above −4° C. The composition containing beta-methyl naphthalene had a brittle point of −18° C. The melting point of this composition was 180° C. and the melt index was 0.75. For comparative purposes, the melt index of the composition containing naphthalene was 0.38 and the composition containing alpha-methyl naphthalene was 0.05.

*Example 2*

To further illustrate the bicyclic additives which can be used according to the invention, a mixture of diamyl naphthalenes, a substantial portion of which had an amyl group in the beta position, was compounded with polypropylene in various concentrations. Three compositions were prepared containing, respectively, 5%, 10% and 20% of the diamyl naphthalene. The composition containing 5% by weight failed in the brittle test, the actual brittle point being 2° C. The composition containing 10% by weight of the diamyl naphthalene had a brittle point of −12° C. and the composition containing 20% had a brittle point of −15° C. Accordingly, the compositions of the invention require at least about 7% by weight of the additive whereas at above about 25% by weight other properties are adversely affected. For example, in the composition containing 20% by weight diamyl naphthalene, the melt index was only 0.21 whereas the value of at least 0.2 is desired so that the composition can be fabricated into desired articles of manufacture.

*Example 3*

A composition containing 10% by weight of decahydronaphthalene in polypropylene was prepared. The brittle point of the resulting composition was −15° C., the melting point was 179° C. and the melt index was 0.88.

*Example 4*

10% by weight of methyl beta-naphthyl ketone was compounded with polypropylene. The resulting composition had a brittle point of −7° C., a melting point of 204° C. and a melt index of 1.21.

*Example 5*

To illustrate the esters of polyfunctional acids which can be used as a component of the subject composition, 10% by weight of acetyl tributyl citrate was compounded with polypropylene. The resulting composition had a brittle point of −7° C.

*Example 6*

Many materials which have heretofore been described as suitable for plasticizing polymers of other materials are not suitable for plasticizing polypropylene. Thus, for example, compositions of polypropylene with di-2-ethyl hexyl adipate, phenyl ethylene oxide, benzoyl acetate, di-octyl-phthalate and tricresyl phosphate were prepared. With some of these additives, namely di-octyl phthalate, tricresyl phosphate and di-2-ethyl hexyl adipate, the resulting compositions not only failed in the brittle test, but were brittle at room temperature. Furthermore, such additives caused decomposition of the polymer composition. None of these materials gave a composition which passed the brittle point test.

The invention claimed is:

1. A new composition of matter consisting essentially of crystalline polypropylene and from 7% to 25% by weight of a material selected from the group consisting of a naphthalene having an alkyl substituent in the beta position, said substituent having from 1 to 5 carbon atoms, decahydronaphthalene, methyl beta-naphthyl ketone, and acetyl tributyl citrate.

2. Composition according to claim 1 wherein said material selected is beta-methyl naphthalene.

3. Composition according to claim 1 wherein said material selected is diamyl naphthalene having an amyl group in the beta position.

4. Composition according to claim 1 wherein said material selected is decahydronaphthalene.

5. Composition according to claim 1 wherein said material selected is methyl beta-naphthyl ketone.

6. Composition according to claim 1 wherein said material selected is acetyl tributyl citrate.

References Cited in the file of this patent

UNITED STATES PATENTS

| | | |
|---|---|---|
| 2,307,037 | Gumlich et al. | Jan. 5, 1943 |
| 2,477,717 | Brandt | Aug. 2, 1949 |